United States Patent
Souvatzidis

(10) Patent No.: US 6,997,485 B2
(45) Date of Patent: Feb. 14, 2006

(54) CONNECTING ASSEMBLY FOR CONNECTING TO A FLUID CONDUIT IN A FLUID TRANSFER SYSTEM

(75) Inventor: Achille Souvatzidis, White Lake, MI (US)

(73) Assignee: General Motors Corporation, Detroit, MI (US)

( * ) Notice: Subject to any disclaimer, the term of this patent is extended or adjusted under 35 U.S.C. 154(b) by 46 days.

(21) Appl. No.: 10/184,596

(22) Filed: Jun. 26, 2002

(65) Prior Publication Data

US 2004/0000790 A1 Jan. 1, 2004

(51) Int. Cl.
*F16L 33/00* (2006.01)

(52) U.S. Cl. .................... 285/256; 285/340; 285/382
(58) Field of Classification Search ............ 285/148.13, 285/148.16, 148.17, 240, 241, 256, 382, 285/239, 238, 319, 309, 223–2, 104, 89
See application file for complete search history.

(56) References Cited

U.S. PATENT DOCUMENTS

| | | | | |
|---|---|---|---|---|
| 1,481,341 A | * | 1/1924 | Bersted | 285/256 |
| 2,452,728 A | * | 11/1948 | Carling | 285/256 |
| 2,517,669 A | * | 8/1950 | Hufferd et al. | 285/256 |
| 2,547,318 A | * | 4/1951 | Harding | 285/340 |
| 3,442,537 A | * | 5/1969 | Courtot et al. | 285/148.13 |
| 3,574,355 A | * | 4/1971 | Oetiker | 285/256 |
| 3,690,703 A | * | 9/1972 | Philipps | 285/148.18 |
| 5,172,942 A | * | 12/1992 | Dillmann | 285/39 |
| 5,730,476 A | * | 3/1998 | Gouda | 285/382 |
| 6,108,895 A | * | 8/2000 | Helsley, Jr. | 29/516 |
| 6,619,699 B1 | * | 9/2003 | Brumfield | 285/256 |

FOREIGN PATENT DOCUMENTS

| | | | | |
|---|---|---|---|---|
| GB | 561283 | * | 5/1944 | 285/256 |
| GB | 562105 | * | 6/1944 | 285/256 |

* cited by examiner

*Primary Examiner*—Aaron Dunwoody
(74) *Attorney, Agent, or Firm*—Laura C. Hargitt

(57) ABSTRACT

A connecting assembly for connecting to a fluid conduit in a fluid transfer system includes a ferrule-type connector having a first open end and a second open end. The first open end of the connector is operable to receive a fluid conduit therein. The second open end of the connector is operable to receive a washer and a flexible hose therein. The washer preferably has a concave cross-section and a central aperture receiving the fluid conduit to secure the connector to the fluid conduit when the washer is press-fit in the second open end of the connector and onto the fluid conduit.

11 Claims, 3 Drawing Sheets

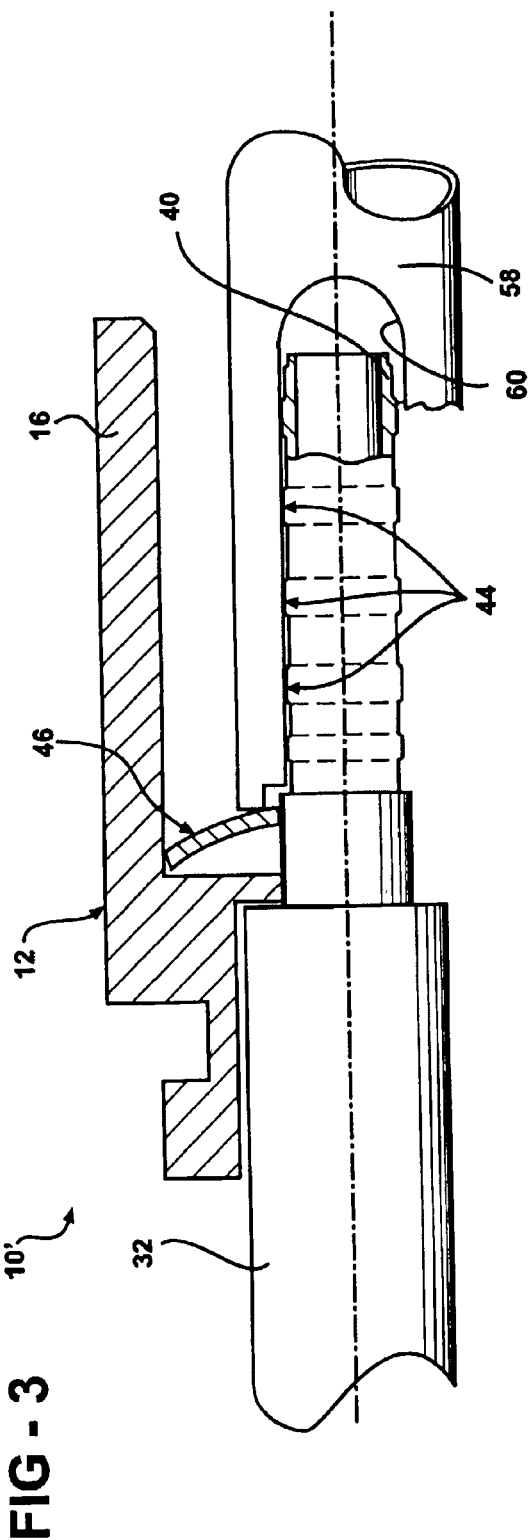

CONNECTING ASSEMBLY FOR CONNECTING TO A FLUID CONDUIT IN A FLUID TRANSFER SYSTEM

BACKGROUND OF THE INVENTION

The present invention relates generally to fluid transfer system fittings and connectors and, in particular, to a connector assembly for connecting to a fluid conduit in a fluid transfer system.

Fittings and connectors for fluid transfer systems, such as automotive hydraulic brake systems, are well known. The connectors are used to couple and assemble various elements of the fluid system. A principal goal in fluid transfer system connector design is to prevent leakage while not restricting fluid flow, especially critical in brake systems.

A typical automotive hydraulic brake system includes a master cylinder that is actuated by the brake pedal. High pressure fluid lines, typically constructed of steel, are in fluid communication with and extend from the master cylinder adjacent to each of the brake cylinders at the wheels of the vehicle, and a flexible brake hose extends from each of the brake cylinders. A connector is used to couple and assemble each of the fluid lines to each associated brake hose. A typical prior art connecting assembly includes a pipe nut, which is retained to the fluid line by a pipe flare and a fitting that is attached to the brake hose and secured to the brake hose via a crimp. The brake hose includes an eyelet for facilitating the attachment of the brake hose fitting. The pipe nut is attached to the brake hose fitting by a threaded connection, allowing the connection of the brake pipe to the brake hose, thus becoming one unit.

The crimping feature of the prior art connecting assembly, however, has been found to be restrictive to the brake fluid flow, which negatively affects the specific brake function and the overall vehicle brake system. In addition, the brake hose fitting of the prior art connecting assembly is disadvantageously expensive and is complicated to manufacture. The prior art connecting assembly is also cumbersome and time-consuming to couple and assemble during the installation process.

It is desirable, therefore, to provide a means for connecting a fluid conduit in a fluid transfer system that does not restrict fluid flow. It is desirable to reduce the overall cost and complexity of fluid transfer systems and of their respective fittings and connectors while continuing to maintain the hydraulic integrity of the fluid transfer system. It is also desirable to simplify the assembly and reduce the manufacturing costs of the fluid transfer system and to reduce the number of parts supplied for the fluid transfer system.

SUMMARY OF THE INVENTION

The present invention concerns a connecting assembly for connecting to a fluid conduit in a fluid transfer system. The connecting assembly includes a ferrule-type connector having a first open end having a first inside diameter and a second open end having a second inside diameter larger than the first inside diameter. The connector is preferably constructed of steel, brass, or a similar material. The first open end of the connector is operable to receive a fluid conduit therein. The fluid conduit has an outside diameter and an open end having a hose mounting portion. The hose mounting portion extends through the connector adjacent to the second open end. The second open end of the connector is operable to receive a washer and a flexible hose therein. The washer preferably is a conical disc spring type washer known in the art as a Belleville spring washer that has a concave cross-section and a central aperture for receiving the hose mounting portion. An open end of the hose receives the hose mounting portion.

The connecting assembly according to the present invention is assembled by inserting the open end of the fluid conduit into the first end of the connector until the hose mounting portion extends adjacent to the second open end of the connector. The fluid conduit is retained within the connector by the concave washer. The concave washer includes an outside diameter and an aperture having an inside diameter formed through the center thereof. The inside diameter of the aperture conforms to the outside diameter of the fluid conduit. The outside diameter of the washer conforms to the inside diameter of the second open end. After the fluid conduit is received in the first open end, the washer is press-fit between the outside diameter of the fluid conduit and the inside diameter of the second open end, retaining the fluid conduit in place within the connector.

After the washer is press-fit in the second open end of the connector, the flexible hose is received in the second open end of the connector. The flexible hose has an inside diameter that tightly conforms to the mounting portion on the fluid conduit and an outside diameter that fits within the inside diameter of the second open end. The second open end of the connector is adapted to be crimped to the flexible hose. The flexible hose is press-fit onto the mounting portion and the second open end of the connector is crimped to retain the flexible hose therein. The second open end of the connector, when crimped, deforms the flexible hose but does not deform the mounting portion of the fluid conduit, which does not restrict fluid flow.

The concave washer is preferably manufactured by a process that includes forming the aperture in the center thereof by the use of a punch in the direction of assembly. By so doing, the flash that is formed by the punching operation is formed on the concave inner surface of the washer that is installed towards the fluid conduit. This flash aids in retaining the washer within the connector by acting as a physical stop, preventing axial movement of the fluid conduit within the connector.

The connector according to the present invention is thus securely retained in its location without the crimping feature of the prior art. The retention by the connecting assembly according to the present invention is in no way restrictive to the hydraulic fluid flow.

The purpose of the concave washer of the present invention is to secure the connector to the fluid conduit with no restrictive means thus avoiding restrictions of any kind to the fluid conduit that can affect the movement and flow of the fluid. The concave washer of the present invention not only secures the fitting but also eliminates any lateral movement during the manufacturing process thus ensuring the location and exact correct crimping of the fluid conduit, such as a brake hose, thereby eliminating waste and improving manufacturing quality. The connecting assembly according to the present invention thus becomes a high quality manufactured and controlled assembly. The concave washer of the present invention also improves the joint quality by eliminating leaking paths that may occur with other prior art connecting assemblies by virtue of its press-fit clearance within the connector.

The connecting assembly according to the present invention is very cost competitive because it advantageously eliminates three elements of the prior art assembly, including the pipe nut, the hose fitting and eyelet. The connecting assembly according to the present invention is not only of lower manufacture costs but also of lower overall costs by virtue of eliminating the labor associated with torquing the pipe nut to the hose fitting, which further reduces the assembly cost. In addition, the labor burden to secure the assembly is greatly minimized due to reduced complexity of the connecting assembly and reduced bracketry.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is a cross-sectional view of the connecting assembly in FIG. 1, shown with a flexible tube attached thereto; and FIG. 4 is a cross-sectional side view of a concave washer in accordance with the present invention.

DESCRIPTION OF THE PREFERRED EMBODIMENT

Figure 1:
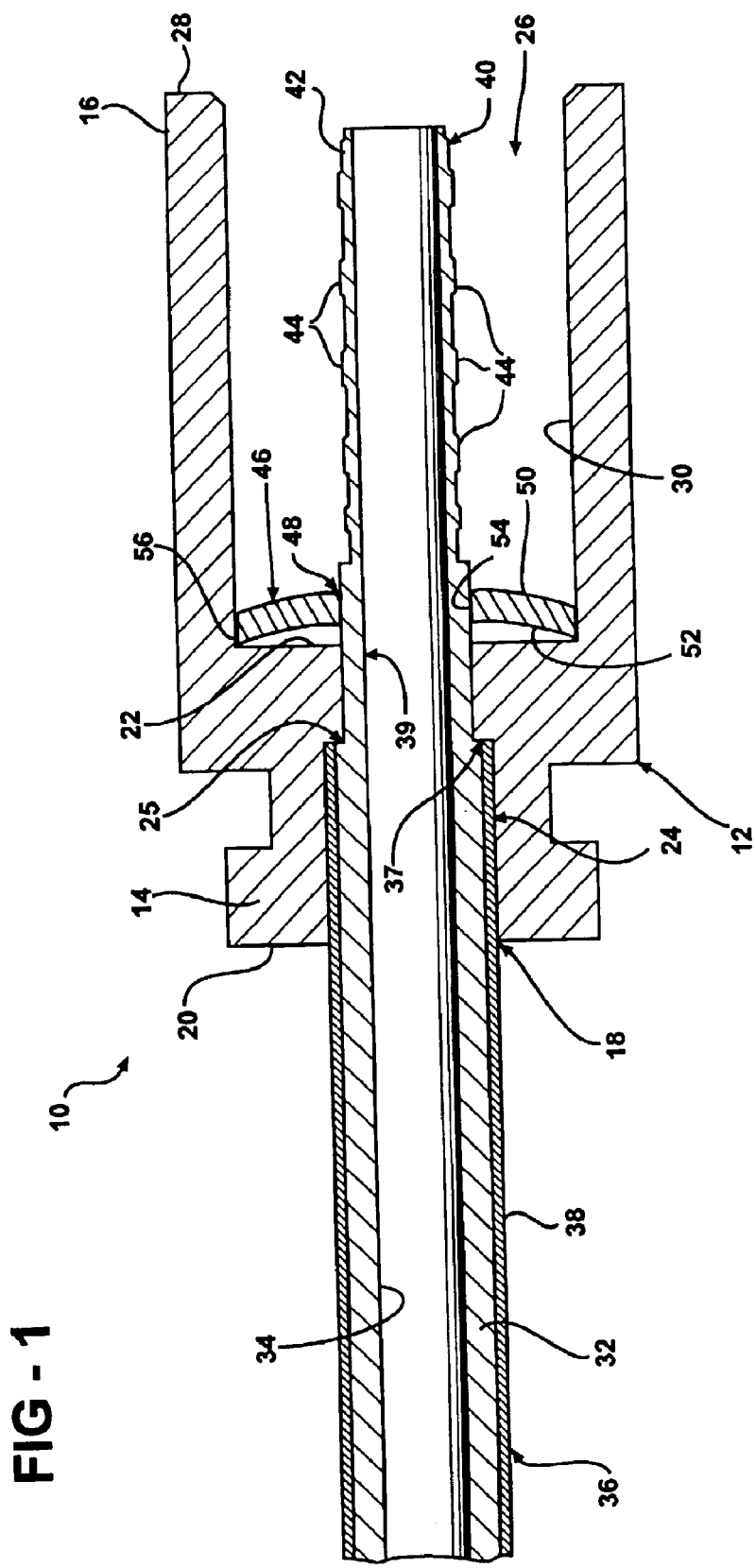
FIG. 1 is a cross-sectional view of a connecting assembly in accordance with the present invention showing the concave washer in an installed position.

Referring now to FIG. 1, a connecting assembly for connecting to a fluid conduit in a fluid transfer system is indicated generally at 10. The connecting assembly 10 includes a ferrule-type connector 12 having a first open end 14 and a second open end 16. The connector 12 is preferably constructed of steel, brass, or a similar material. An aperture 18 extends through the first open end 14 between an outer surface 20 and an inner surface 22 of the first open end 14. The aperture 18 is defined by an inner wall 24 having an inside diameter. The inner wall 24 includes a stepped portion 25 for facilitating engagement with a fluid conduit, outlined in more detail below. An aperture 26 extends through the second open end 16 between an outer surface 28 and the inner surface 22, providing a fluid flow passage between the first open end 14 to the second open end 16. The aperture 28 is defined by an inner wall 30 having an inside diameter, the inside diameter of the inner wall 30 being greater than the inside diameter of the inner wall 24.

A fluid conduit 32 includes an inner wall 34 having an inside diameter and an outer wall 36 having an outside diameter and is preferably constructed of steel or a similar material. The fluid conduit 32 is in fluid communication with a fluid transfer system (not shown). The fluid conduit 32 includes a rubberized coating 38 applied on the circumference of the outer wall 36. The fluid conduit 32 includes a mounting portion 40 formed on an open end 42 thereof. The mounting portion 40 includes a plurality of projections 44 extending from an outer wall thereof for facilitating engagement with a flexible hose (not shown). The outer wall 36 of the fluid conduit 32 includes a stepped portion 37 for engagement with the stepped portion 25 of the connector 12. The fluid conduit 32 includes an intermediate portion 39 having an outside diameter extending between the stepped portion 37 and the mounting portion 40.

A concave washer 46, such as a conical disc spring type washer known in the art as a Belleville spring washer or similar washer, having a generally concave cross-section is received in the aperture 26 of the second open end 16. The washer 46 includes an aperture 48 extending through a convex surface 50 and a concave surface 52 thereof. The aperture 48 is defined by an inner wall 54 having an inside diameter, the inside diameter of the inner wall 54 corresponding to the outside diameter of the intermediate portion 39 of the fluid conduit 32. The washer 46 includes an outer wall or peripheral edge 56 having an outside diameter, the outside diameter of the outer wall 56 corresponding to the inner diameter of the inner wall 30 of the second open end 16 of the connector 12. The washer 46 is shown in an installed position, where the connector 12 and the fluid conduit 32 are not secured to each other.

Figure 2:
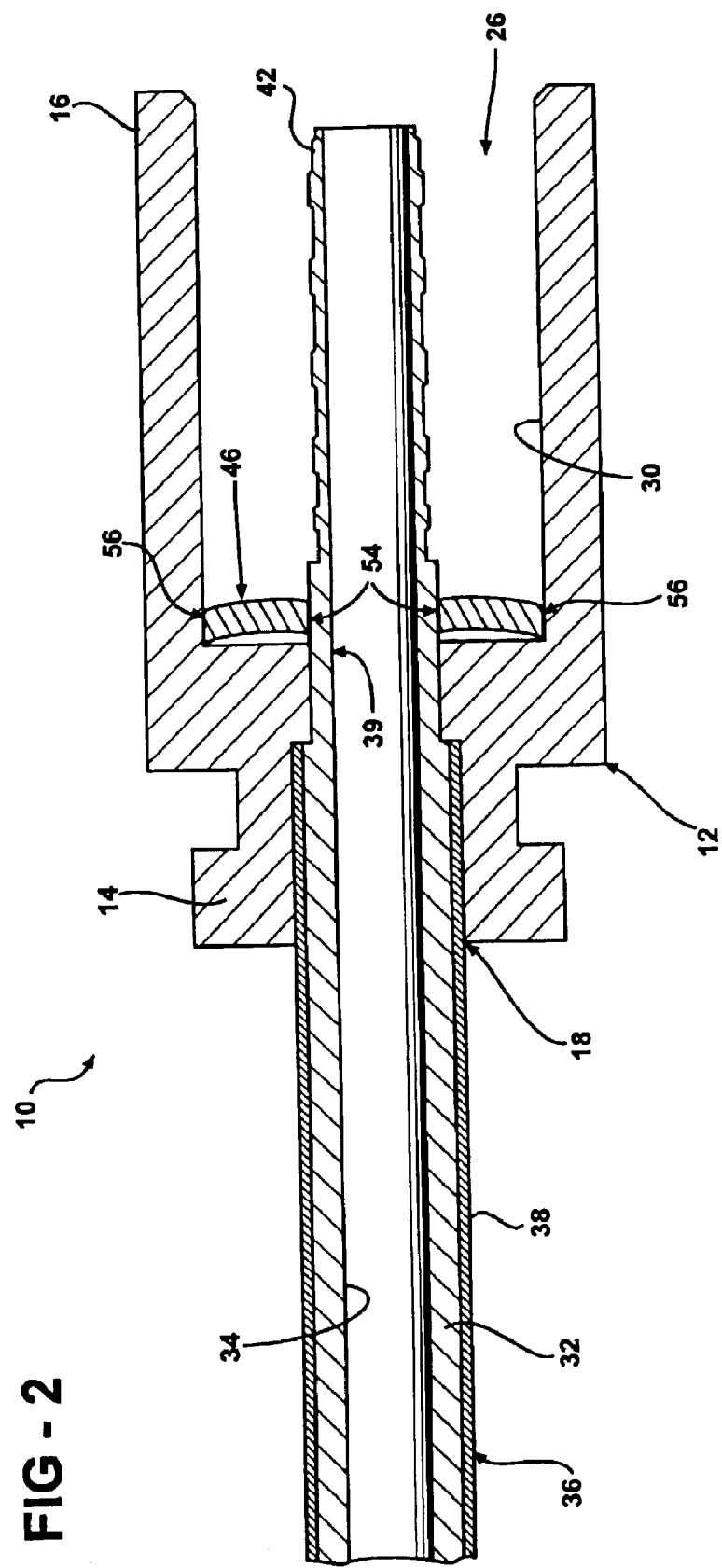
FIG. 2 is a cross-sectional view of the connecting assembly in FIG. 1, shown with the concave washer in a secured position.

Referring now to FIG. 2, the connecting assembly 10 is shown with the washer 46 in a secured position. After being set in place in the installed position of FIG. 1, the washer 46 is press-fit into the secured position. When the washer 46 is press-fit into the secured position, the outer wall 56 of the washer 46 is forced against the inner wall 30 of the second open end 16 of the connector 12 and the inner wall 54 of the washer 46 is forced against the outside diameter of the intermediate portion 39 of the fluid conduit 32. By virtue of this press-fit, the washer 46 secures the fluid conduit 32 to the connector 12, and retains the fluid conduit 32 in an axial position within the connector 12.

Referring now to FIG. 3, a connecting assembly in accordance with the present invention is indicated generally at 10'. The connecting assembly 10' includes the connector 12 and the fluid conduit 32, shown retained by the washer 46. A flexible hose 58 having an interior surface 60 is shown attached to the mounting portion 40 of the fluid conduit 32. The hose 58 is preferably constructed or rubber or similar material. The interior surface 60 of the hose 58 conforms to the exterior surface of the mounting portion 40 and is retained to the mounting portion 40 by the plurality of projections 44 thereon. The hose 58 is preferably pressed to the mounting portion 40 by the use of an axial force. The second open end 16 of the connector 12 is then crimped (not shown) to retain the hose 58 therein. The second open end 16, when crimped, deforms to retain the flexible hose 58 but does not deform the mounting portion 40 of the fluid conduit 32 and, therefore, does not restrict fluid flow for the fluid transfer system.

Referring now to FIG. 4, a detailed view is shown of the concave washer 46 in accordance with the present invention. The concave washer 46 is preferably manufactured by a process that includes forming the aperture 48 in the center thereof by the use of a punch or similar device (not shown) in a direction of assembly, indicated by an arrow 59. By so doing, a flash 62 is formed by the punching operation on the inner surface 52 of the washer 46 that is installed facing towards the inner surface 22 of the first open end 14 of the fluid conduit 32. The flash 62 aids in retaining the washer 46 within the connector second open end 16 by acting as a physical stop and preventing axial movement of the fluid conduit 32 within the connector 12.

In accordance with the provisions of the patent statutes, the present invention has been described in what is considered to represent its preferred embodiment. However, it should be noted that the invention can be practiced otherwise than as specifically illustrated and described without departing from its spirit or scope. For example, while the present invention has been described in the context of automotive brake hydraulic systems, those skilled in the art will appreciate that the connecting assembly of the present invention is not limited to brake systems and may be utilized for numerous types of fluid transfer systems.

What is claimed is:

1. A connecting assembly for a hydraulic braking system, comprising:

a connector having a first open end with a first outer surface, a second open end with a second outer surface, a first aperture formed in said connector and being defined by a first interior wall extending between said first outer surface and an interior surface of said connector, and a second aperture formed in said connector and being defined by a second interior wall extending between said second outer surface and said interior surface;

a fluid conduit having an outer wall and an open end to be connected, said fluid conduit extending through said first aperture and into said second aperture with said fluid conduit being adjacent said second open end of said connector; and a spring washer having a concave cross section and a central aperture formed therein, said spring wisher being In a secured position in said second aperture preventing separation of said fluid conduit from said connector, said spring washer having an outer diameter defined by an outer wall and said central aperture being defined by an inner wall having an inner diameter, said outer diameter being sized to permit said spring washer to be slidably moved in said second aperture from said second open end to an installed position adjacent said interior surface and said inner diameter being sized to permit said fluid conduit to be slidably received by said central aperture, whereby when said spring washer is moved from said installed position to said secured position, said outer wall moves into engagement with said second interior wall and said inner wall moves into engagement with said fluid conduit outer wall.

2. The assembly according to claim 1 wherein said first interior wall of said connector includes a stepped portion and said fluid conduit outer wall includes a stepped portion engaging said first interior wall stepped portion.

3. The assembly according to claim 1 including a plurality of projections extending from said outer wall of said fluid conduit adjacent to said open end of said fluid conduit.

4. The assembly according to claim 1 including a hose having an open end, said open end of said hose being received in said second open end of said connector arid said open end of said fluid conduit being received in said open end of said hose.

5. A connecting assembly for a hydraulic braking system, comprising, a connector having a first open end with a first outer surface, a second open end with a second outer surface, a first aperture formed in said connector and being defined by a first interior wall extending between said first outer surface and an interior surface of said connector, said first interior wall having a step formed therein to define a reduced diameter adjacent to said interior surface and a second aperture formed in said connector and being defined by a second interior wall extending between said second outer surface and said interior surface;

a fluid conduit having an outer wall and an open end to be connected, said fluid conduit extending through said first aperture and into said second aperture with said fluid conduit being adjacent said second open end of said connector, said outer wail having a step formed engaging said first interior wall step; and a spring washer baying a concave cross section and a central aperture formed therein, said spring washer being in a secured position in said second aperture preventing separation of said fluid conduit from said connector, said spring washer having an outer diameter defined by an outer wall and said central aperture being defined by an inner wall having an inner diameter, said outer diameter being sized to permit said spring washer to be slidably moved in said second aperture from said second open end to an installed position adjacent said interior surface and said inner diameter being sized to permit said fluid conduit to be slidably received by said central aperture, whereby when said spring washer is moved from said installed position to said secured position, said outer wall moves into engagement with said second interior wall and said inner wall moves into engagement with said fluid conduit outer wall.

6. The assembly according to claim 5 including a plurality of projections extending from said outer wall of said fluid conduit adjacent to said open end of said fluid conduit.

7. The assembly according to claim 6 including a hose having an open end, said open end of said hose being received in said second open end of said connector and said open end of said fluid conduit being received in said open end of said hose and said plurality of projections engaging said hose.

8. A connecting assembly for a hydraulic braking system, comprising:

a connector having a fist open end with a first outer surface, a second open end with a second outer surface, a first aperture formed in said connector and being defined by a first interior wall extending between said first outer surface and an interior surface of said connector, and a second aperture formed in said connector and being defined by a second interior wall extending between said second outer surface and said interior surface;

a fluid conduit having an outer wall and an open end to be connected, said fluid conduit extending through said first aperture and into said second aperture with said fluid conduit being adjacent said second open end of said connector; and a spring washer having an outer diameter defined by an outer wall and a central aperture formed therein and defined by an inner wall having an inner diameter, wherein a cross section extending from said outer wall to said inner wall is concave, said spring washer being in a secured position in said second aperture preventing separation of said fluid conduit from said connector, said outer diameter of said spring washer being sized to permit said spring washer to be slidably moved in said second aperture from said second open end to an installed position adjacent said interior surface and said inner diameter being sized to permit said fluid conduit to be slidably received by said central aperture, whereby when said spring washer is moved from said installed position to said secured position, said outer wall moves into engagement with said second interior wall and said inner wall moves into engagement with said fluid conduit outer wall.

9. The assembly according to claim 8 wherein said first interior wall of said connector includes a stepped portion and said fluid conduit outer wall includes a stepped portion engaging said first interior wall stepped portion.

10. The assembly according to claim 8 including a plurality of projections extending from said outer wall of said fluid conduit adjacent to said open end of said fluid conduit.

11. The assembly according to claim 8 including a hose having an open end, said open end of said hose being received in said second open end of said connector and said open end of said fluid conduit being received in said open end of said hose.

* * * * *